Jan. 9, 1934.  W. WITHINGTON  1,942,629
BROOM RAKE
Filed Sept. 9, 1930
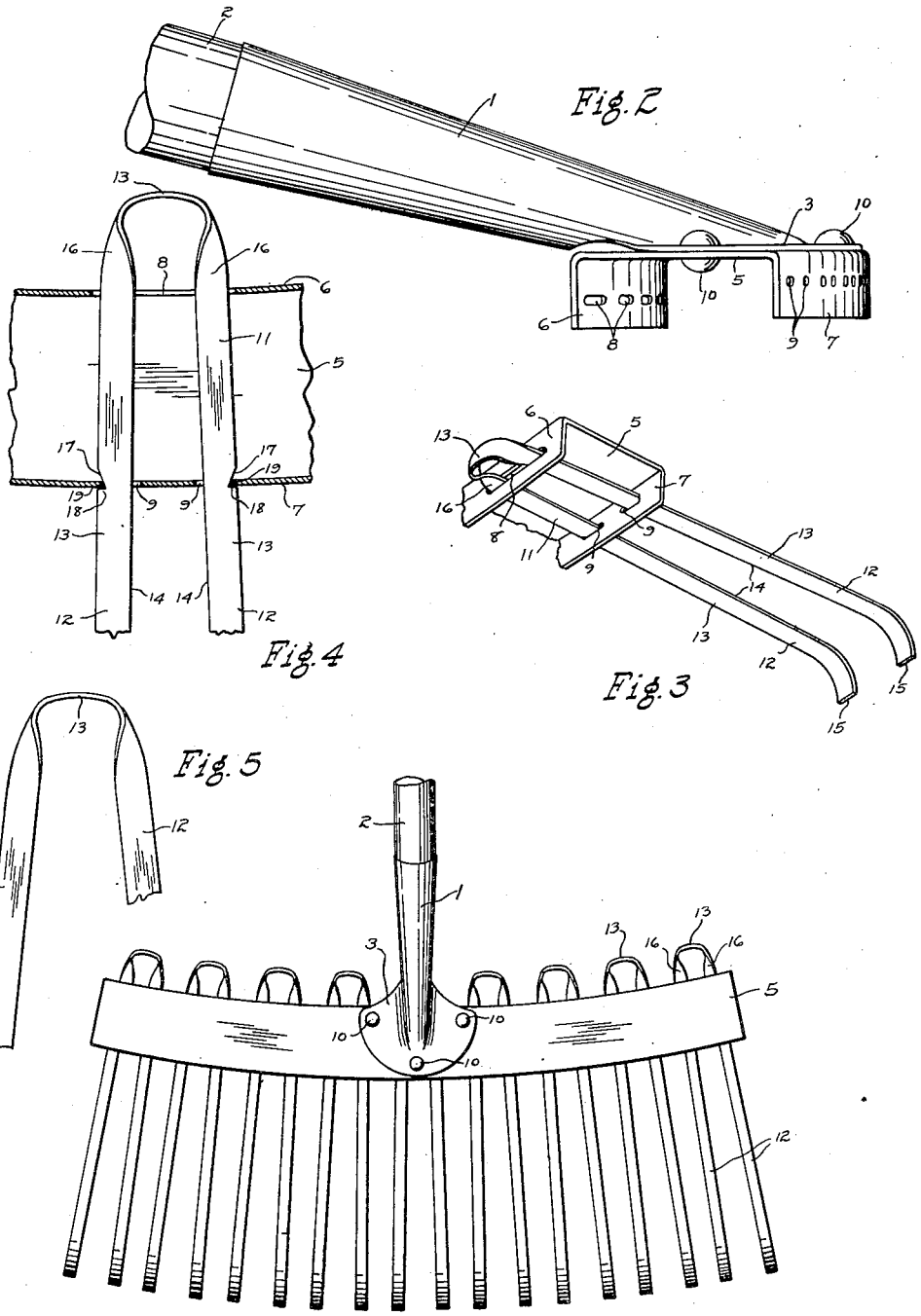
INVENTOR.
Winthrop Withington
BY
Slough and Canfield
ATTORNEYS Patented Jan. 9, 1934

1,942,629

UNITED STATES PATENT OFFICE 1,942,629

BROOM RAKE

Winthrop Withington, Cleveland, Ohio, assignor to The American Fork & Hoe Company, Cleveland, Ohio, a corporation of Ohio Application September 9, 1930. Serial No. 480,676

19 Claims. (Cl. 55—10)

My invention relates to improvements in that type of rakes which are commonly known as broom rakes.

The present application involves certain improvements in that type of rake exemplified by the disclosures of my prior Patent Re. 17,606, dated February 25, 1930, and of the co-pending application of William H. Bergmann, Serial No. 388,326, filed August 26, 1929.

In the said co-pending application of Bergmann, a rake construction is disclosed involving the principle of making the tines in integrally joined pairs formed by bending a wire to the form of a loop.

The present application relates also to tines formed in integrally joined pairs, but as contrasted with the rake of the said Bergmann application, each of the tines comprises an elongated strip of spring steel or like spring material, and the associated tines of a pair are joined at their rear ends by an integral section of spring material forming the tines, suitably twisted to provide rake head engaging portions to prevent end-wise movement of the tines in a forward direction, and also to effect the presentation of the spring tines, so that both edges of all of the tines are disposed substantially in lateral alignment.

An object of my invention is to provide an improved rake of the broom type employing flat spring tines.

Another object of my invention is to provide an improved rake of the broom type employing flat spring tines, which are end-wise insertable and removable from the rake head.

Another object of my invention is to provide an improved rake employing flat spring tines wherein the cost of manufacture is low.

Another object of my invention is to provide an improved broom rake with readily removable and/or insertable flat spring steel tines, formed in integrally joined pairs.

Other objects of my invention and the invention itself will become more apparent by reference to the following description of an embodiment of my invention, which is illustrated in the accompanying drawing:

In the drawing:

Fig. 1 is a plan view of a rake embodying the principles of my invention, the rake handle being illustrated as broken away for compactness of illustration;

Fig. 2 is a side elevational view of the rake head, the wood handle being shown as broken away and the head containing no tines later to be supplied as in Fig. 1;

Figs. 3 and 4 are respectively isometric and bottom plan views of fragments of the rake head and an associated tine element secured therein, said element comprising an integrally joined pair of tine prongs;

Fig. 5 is a plan view of a tine element comprising two integrally joined tines, shown apart from the rake head.

In the figures the views of Figs. 2 and 4 are relatively enlarged over those of Figs. 1 and 3, no effort being made to show the different views to the same scale.

Referring now to the different figures of drawing, in all of which like parts are shown and indicated by like reference characters, the rake head comprises a handle supporting socket element 1 presenting an open tapered socket for receiving a correspondingly tapered end of a rake handle 2 at one end and at the other end the socket element is provided with a substantially planular flange 3 of fan-like form adapted to support a cross head 5 of channel form, said cross head being preferably arcuately curved in the lateral directions and providing an intermediate top wall and two end walls, the rear end wall being shown at 6 and the front end wall at 7. Both the end walls 6 and 7 are provided with a plurality of aligned elongated apertures, the apertures 8 through the rear wall being much longer than the apertures 9 through the front wall, there being twice as many of the apertures 9 as of the apertures 8.

Suitable means, such as a plurality of rivets 10 are employed to rigidly secure the socket element flange 3 to the intermediate wall of the channeled cross head element 5 with the tapered socket portion of the element 1 presented rearwardly and upwardly at an acute angle to the plane of the cross head intermediate wall to which the flange 3 is secured.

A plurality of tine elements 11 are supported in the cross head, these each being of substantially U-form and comprising preferably slightly divergent companion prongs 12 and an intermediate integrally formed yoke portion 13 joining the prongs, each of the tine elements being given a half twist, as shown at 16, in preferably opposite directions adjacent the two ends of the joining yoke 13, whereby the companion prongs 12 may present their broader faces in corresponding upward and downward directions and with their relatively narrow lateral outer and inner edges respectively shown at 13 and 14, disposed in substantial alignment with the edges 14 in opposed adjacent relation, whereby the tines may resiliently yield upwardly and downwardly.

The tines so formed are then projected through the suitably placed apertures 8 and 9 of the rear and front walls of the channel head, by first inserting the preferably downturned tip ends 15 simultaneously through a single one of the relatively longer elongated aperture 8 and then substantially simultaneously projecting the tine prongs 12 by their tip ends 15 through separate apertures 9 of the front wall 7 of said head. Each of the longer apertures 8 of the rear wall 6 is provided with a pair of shorter apertures 9 of the front wall immediately in front of it.

In projecting the companion tine prongs 12 through the openings 8 and 9, it is necessary for the operator to inwardly compress the two tine prongs towards each other against the inherent resiliency of the intermediate portion 13 of the tine element joining the companion tine prongs and which undeformed causes the tine prongs 12 to extend more divergently, as shown in Fig. 5, than the relative positions taken when the tine element is secured within the head as shown in Figs. 1 to 4 inclusive.

A ratchet retaining notch 17 is formed in the outer edge portion of each prong 12 at the same distance from the joined ends 13 and at a suitable distance therefrom, so that when the prongs are projected to their final position, whereat the twisted portion 16 engages with the upper and lower edges of the elongated apertures 8 to prevent further forward relative movement of the tines to the head, the shoulders 18 provided by the notches 17 to snap over the lateral edge portions 19 of the said wall 7 for each aperture to prevent rearward movement of the tine from the head.

However, the tines may be removed by the operator grasping the intermediate portion 13 of each tine pair and with his other hand inwardly compressing the prongs 12 toward each other to release the latching engagement had between the shoulders 18 and the portions 19 of the head 7 laterally bounding the apertures 9 and withdrawing the tines rearwardly from the head.

Having described my invention in a specific embodiment, I am aware that numerous and extensive departures may be made from the embodiment illustrated and described herein, but without departing from the spirit of my invention.

I claim:

1. A broom rake comprising a handle, a channeled cross head at an end thereof and supported thereby, said cross head being provided with an intermediate wall and two substantially parallel end walls, each of said end walls provided with a plurality of elongated apertures extending laterally of the head in relatively spaced relation, and a plurality of flat spring strip elements, each bent to substantially U-form to provide a pair of flat rake tines rearwardly joined by a resilient yoke containing the tines in divergent positions, each of said rake tines projected forwardly from said head through an aperture of each of the said end walls, and with the lateral edges of the flat tines disposed in substantially parallel opposed relation, each of the tines of each pair being notched near an outer edge intermediate its ends, and a portion of said head projected within said notch to restrain the tines from longitudinal movement relative to said head.

2. A broom rake comprising a cross head of channeled form providing front and rear walls, said walls being apertured at intervals, and a plurality of tine elements each comprising a pair of flat spring tine prongs and an intermediate spring yoke therefor joining the prongs at their rear ends, said prongs projected through apertures of the front and rear walls.

3. A broom rake comprising a cross head of channeled form providing front and rear walls, said walls being apertured at intervals, and a plurality of tine elements each comprising a pair of flat spring tine prongs and an intermediate spring yoke therefor joining the prongs at their rear ends, said prongs projected through apertures of the front and rear walls, each of said tines twisted intermediate said yoke and said rear wall to present the tine prongs flatwise with their lateral edges in substantially lateral alignment.

4. A broom rake comprising a handle, a cross-head at an end thereof and supported thereby, and a plurality of flat spring tines projected forwardly in pairs from the head in laterally spaced substantially coplanar generally parallel relation, and spring means formed from the flat material of the tines associated with each pair of tines resiliently resisting lateral displacement of one tine of the pair relative to the other.

5. A broom rake comprising a handle, a cross-head at an end thereof and supported thereby, and a plurality of flat spring tines each supported on the head at intermediate portions of the tines and the tines projecting forwardly in pairs from the head in laterally spaced substantially coplanar generally parallel relation, and spring means formed from the flat material of the tines associated with each pair of tines resiliently resisting lateral displacement of one tine of the pair relative to the other.

6. A broom rake, comprising a handle, a cross-head at an end thereof and supported thereby, and a plurality of flat spring tines, removably supported in pairs on the head and projecting forwardly from the head in laterally spaced substantially coplanar generally parallel relation, and spring means formed from the flat material of the tines associated with each pair of tines resiliently resisting lateral displacement of one tine of the pair relative to the other.

7. A broom rake comprising a handle, a channeled cross-head at an end thereof and supported thereby, said cross-head being provided with an intermediate wall and two substantially parallel end walls, each of said end walls provided with a plurality of elongated apertures extending laterally of the head in relatively spaced relation, a plurality of flat spring tines projected in pairs forwardly from said head through apertures of the said end walls and in laterally spaced substantially coplanar generally parallel relation, and spring means formed from the flat material of the tines associated with each pair of tines resiliently resisting lateral movement of one tine of the pair relative to the other.

8. In a broom rake comprising a handle, a cross-head at an end thereof and supported thereby, said cross-head being provided with a plurality of elongated apertures extending laterally of the head in relatively spaced relation, and a plurality of flat spring tines projected forwardly in pairs from said head through the head apertures, and laterally spaced substantially coplanar and in generally parallel relation, and spring means formed from the flat material of the tines associated with each pair of tines resiliently resisting lateral displacement of one tine of the pair relative to the other.

9. In a broom rake comprising a handle, a cross-head at an end thereof and supported thereby, said cross-head being provided with a plurality of elongated apertures extending laterally of the head in relatively spaced relation, and a plurality of flat spring tines projected forwardly in pairs from said head through the head apertures, and laterally spaced substantially coplanar and in generally parallel relation, and spring means formed from the flat material of the tines associated with each pair of tines resiliently resisting lateral displacement of one tine of the pair relative to the other, and at least one of each pair of said tines being notched on an outer edge intermediate its end and a portion of said head being projected within said notch to restrain the tines from longitudinal movement relative to said head.

10. A broom rake comprising a handle, a cross-head at an end thereof and supported thereby, and a plurality of tines projected in pairs forwardly from the head in laterally spaced substantially coplanar generally parallel relation, and spring means associated with each pair of tines resiliently resisting relative lateral displacement thereof, each pair of tines being generally U-shape and formed from a single piece of flat spring metal and the spring means comprising a portion of the metal disposed out of the plane of the U-legs thereof.

11. A broom rake comprising a handle, a cross-head at an end thereof and supported thereby, and a plurality of flat spring tines each supported on the head at intermediate portions of the tines and the tines projected in pairs forwardly from the head in laterally spaced substantially coplanar generally parallel relation, and spring means associated with each pair of tines resiliently resisting relative lateral displacement thereof, each pair of tines being generally U-shaped and formed from a single piece of flat spring metal and the spring means comprising a portion of the metal disposed out of the plane of the U-legs thereof, and each pair of tines being integrally connected by a portion of the flat spring material disposed out of the plane of the tines.

12. A broom rake comprising a handle, a cross-head at an end thereof and supported thereby, and a plurality of flat spring tines, each removably supported on the head and projected forwardly in pairs from the head in laterally spaced substantially coplanar generally parallel relation each pair joined by a connecting portion, and spring means associated with each pair of tines resiliently resisting lateral displacement of one tine of the pair relative to the other, said spring means comprising the connecting portion of each pair of tines.

13. A broom rake comprising a handle, a channeled cross-head at an end thereof and supported thereby, said cross-head being provided with an intermediate wall and two substantially parallel end walls, each of said end walls provided with a plurality of elongated apertures extending laterally of the head in relatively spaced relation, a plurality of flat spring tines projected forwardly in pairs from said head through apertures of the said end walls and in laterally spaced substantially coplanar generally parallel relation each pair joined by a connecting portion, and spring means associated with each pair of tines resiliently resisting lateral movement of one tine of the pair relative to the other, said spring means comprising the connecting portion of each pair of tines.

14. In a broom rake comprising a handle, a cross-head at an end thereof and supported thereby, said cross-head being provided with a plurality of elongated apertures extending laterally of the head in relatively spaced relation, and a plurality of flat spring tines projected forwardly in pairs of said head through the head apertures, and laterally spaced substantially coplanar and in generally parallel relation each pair joined by a connecting portion, and spring means associated with each pair of tines resiliently resisting lateral displacement of one tine of the pair relative to the other, said spring means comprising the connecting portion of each pair of tines.

15. In a broom rake comprising a handle, a cross-head at an end thereof and supported thereby, said cross-head being provided with a plurality of elongated apertures extending laterally of the head in relatively spaced relation, and a plurality of flat spring tines projected forwardly in pairs of said head through the head apertures, and laterally spaced substantially coplanar and in generally parallel relation, each pair joined by a connecting portion, and spring means associated with each pair of tines resiliently resisting lateral displacement of one tine of the pair relative to the other, and at least one of each pair of said tines being notched near an outer edge intermediate its end and a portion of said head projected within said notch to restrain the tines from longitudinal movement relative to said head, said spring means comprising the connecting portion of each pair of tines.

16. In a broom rake, a tine element comprising a pair of coplanar resilient flat forwardly extending tine prongs and a resilient yoke joining the prongs at their rear ends, and resiliently constraining the forward ends of the prongs against relative lateral displacement.

17. A one-piece broom rake tine composed of flat spring material generally of hairpin form comprising a pair of flat coplanar resilient forwardly extending tine prongs integrally united at their rearward ends by a resilient yoke portion of the tine disposed out of the plane of the prongs and resiliently constraining the prongs against relative lateral displacement.

18. A one piece broom rake tine composed of flat spring material generally of hairpin form comprising a pair of flat resilient coplanar forwardly extending tine prongs joined by a connecting portion, formed from the flat tine material and disposed out of the plane of the prongs and resiliently constraining the prongs against relative lateral displacement.

19. A one piece broom rake tine composed of flat spring material generally of hairpin form comprising a pair of flat coplanar resilient forwardly extending tine prongs, one of which is notched in an edge of the prong, said prongs being integrally united at their rearward ends by a resilient yoke portion of the tine disposed out of the plane of the prongs to resiliently constrain the prongs against relative lateral displacement.

WINTHROP WITHINGTON.